(12) United States Patent
Singh et al.

(10) Patent No.: US 11,574,579 B2
(45) Date of Patent: Feb. 7, 2023

(54) ENABLING DISPLAY FILTERS IN COLLABORATIVE ENVIRONMENTS

(71) Applicant: Dell Products L.P., Round Rock, TX (US)

(72) Inventors: Pawan Singh, Bangalore (IN); Harish Agrawal, Bangalore (IN); Anil Gurumurthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 17/386,311

(22) Filed: Jul. 27, 2021

(65) Prior Publication Data
US 2022/0415235 A1    Dec. 29, 2022

(30) Foreign Application Priority Data

Jun. 23, 2021    (IN) .............................. 202111028223

(51) Int. Cl.
| | | |
|---|---|---|
| *G09G 3/20* | (2006.01) | |
| *G06T 11/00* | (2006.01) | |
| *H04N 7/15* | (2006.01) | |

(52) U.S. Cl.
CPC .......... *G09G 3/2003* (2013.01); *G06T 11/001* (2013.01); *H04N 7/15* (2013.01)

(58) Field of Classification Search
CPC ............................ G09G 3/2003; G06T 11/001
USPC ............................. 345/690; 348/54; 382/265
See application file for complete search history.

(56) References Cited

U.S. PATENT DOCUMENTS

| | | | | |
|---|---|---|---|---|
| 2008/0165197 A1* | 7/2008 | Bakalash | ................ | G06F 9/505 345/505 |
| 2010/0188557 A1* | 7/2010 | Tan | ........................ | G06F 3/0425 348/744 |
| 2010/0238263 A1* | 9/2010 | Robinson | ................ | H04N 7/144 348/14.08 |
| 2010/0277576 A1* | 11/2010 | Fattal | ....................... | H04N 7/144 348/54 |
| 2013/0021358 A1* | 1/2013 | Nordlund | ................ | G06T 11/40 345/581 |
| 2015/0206285 A1* | 7/2015 | Pajak | ....................... | G06T 5/002 382/265 |
| 2022/0366131 A1* | 11/2022 | Ekron | ................ | G06F 16/9577 |

* cited by examiner

*Primary Examiner* — Prabodh M Dharia
(74) *Attorney, Agent, or Firm* — Kirton McConkie; Brian Tucker (57) ABSTRACT

Display filters, including color filters, can be enabled in collaborative environments. When a user of an end user device desires to have a color filter applied, a windowing system or other source of graphics data can render a frame via a graphics driver. Once the frame is rendered, the graphics driver can enable a collaboration tool to capture the frame and share it via a collaboration solution. Separately from the rendering of the frame, the windowing system can leverage a color filter module to directly apply a color filter to the frame. Once the color filter is applied, the windowing system can cause the frame to be displayed locally. Because the graphics driver is not used to apply the color filter, the color filter will not be applied to any frame that the collaboration tool captures and shares.

20 Claims, 7 Drawing Sheets

ENABLING DISPLAY FILTERS IN COLLABORATIVE ENVIRONMENTS

CROSS-REFERENCE TO RELATED APPLICATIONS

This application claims priority to India Patent Application No. 202111028223 which was filed on Jun. 23, 2021.

BACKGROUND

Color blindness affects nearly 10% of the human population. When working with computers, a person with color blindness may perceive colors differently from what is displayed on a monitor leading to unintended consequences.

To address such concerns, a graphics system may apply a color filter to display content. For example, with the Mesa 3D graphics library, a software renderer can be created and used to apply a color filter to the display content at the rendering layer. As a result, the display content of all applications will be modified in accordance with the color filter.

This application of a color filter at the rendering layer creates various problems in a collaborative environment. For example, if a user who is color blind shares his or her screen in a collaborative environment (e.g., during a Zoom or Skype meeting or via a remote desktop or other virtual desktop infrastructure (VDI) session), the application of a color filter at the color-blind user's computer will modify the screen that is shared with all users. For any non-color-blind user that may be participating in the collaborative environment, the modifications that the color filter makes to the shared screen can degrade the collaborative experience.

BRIEF SUMMARY

The present invention extends to methods, systems, and computer program products for enabling display filters, including color filters, in collaborative environments. When a user of an end user device desires to have a color filter applied, a windowing system or other source of graphics data can render a frame via a graphics driver. Once the frame is rendered, the graphics driver can enable a collaboration tool to capture the frame and share it via a collaboration solution. Separately from the rendering of the frame, the windowing system can leverage a color filter module to directly apply a color filter to the frame. Once the color filter is applied, the windowing system can cause the frame to be displayed locally. Because the graphics driver is not used to apply the color filter, the color filter will not be applied to any frame that the collaboration tool captures and shares.

In some embodiments, the present invention may be implemented as method for enabling display filters in collaborative environments. A windowing system or other source of graphics data may render, via a graphics driver, the graphics data to a framebuffer object to define a frame to thereby enable a collaboration tool to capture and share the frame via a collaboration solution. After the frame is rendered to the framebuffer object, the windowing system can cause a color filter to be directly applied to the frame defined in the framebuffer object. After the color filter has been directly applied to the frame defined in the framebuffer object, the windowing system can cause the frame to be displayed locally.

In some embodiments, the present invention may be implemented as computer storage media storing computer executable instructions which when executed implement a method for enabling display filters in collaborative environments. This method may include: repeatedly rendering, via a graphics driver, graphics data to a framebuffer object to define frames to thereby enable a collaboration tool to capture and share the frames via a collaboration solution; after each of the frames is rendered to the framebuffer object, causing a color filter to be directly applied to the frame; and after the color filter has been directly applied each of the frames, causing the frame to be displayed locally.

In some embodiments, the present invention may be implemented as end user device that includes one or more processors and computer storage media storing computer executable instructions which when executed implement a method for enabling display filters in collaborative environments. Graphics data can be rendered via a graphics driver to a framebuffer object to define a frame to thereby enable a collaboration tool to capture and share the frame via a collaboration solution. After the frame is rendered to the framebuffer object, a color filter can be applied directly to the frame defined in the framebuffer object. After the color filter has been directly applied to the frame defined in the framebuffer object, the frame can be displayed locally.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the specification and the claims, the term "end user device" should be construed as encompassing any computer that is capable of outputting display content to a display device. The term "collaboration solution" should be construed as encompassing any solution that allows one end user device to view display content generated by or for another end user device. A collaboration solution may therefore be a videoconferencing platform, such as Zoom or Skype, that allows one user to share video or his or her screen with other users. A collaboration solution may also be a virtual desktop infrastructure by which a remote desktop or application may be shared with multiple users. The term "display content" should be construed as content, typically in the form of a frame, that can be visually displayed on a display device. In other words, display content is what the user sees when using his or her end user device.

Figure 1:
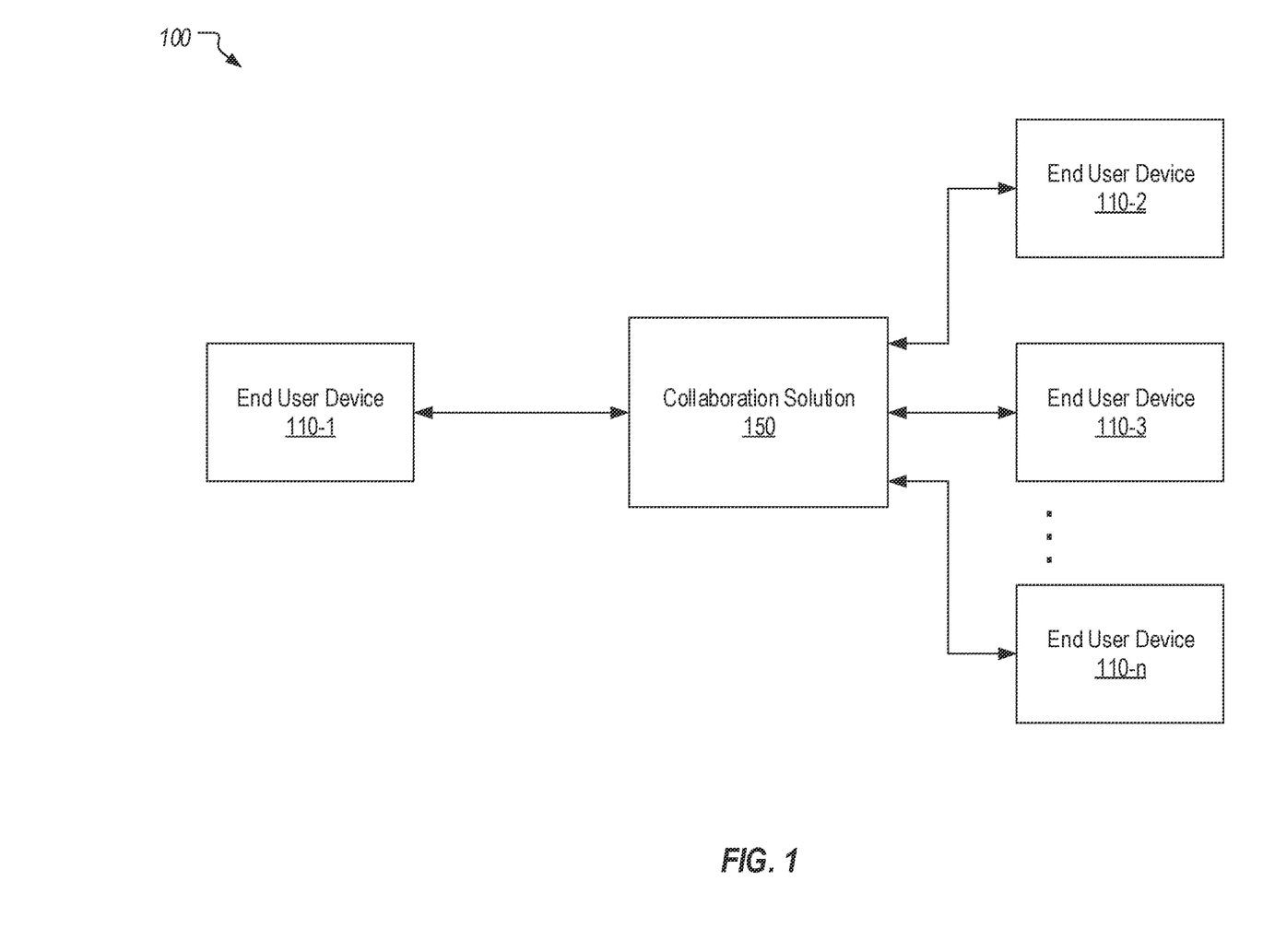
FIG. 1 illustrates an example computing environment in which the present invention can be implemented.

FIG. 1 provides an example of a collaborative computing environment 100 in which embodiments of the present invention may be implemented. Computing environment 100 includes a plurality of end user devices 110-1 through 110-*n* (collectively "end user devices 110") and a collaboration solution 150. In this example, collaboration solution 150 may represent Zoom, Skype or another videoconferencing solution that may allow a user of end user device 110-1 to share display content generated on end user device 110-1 with users of end user devices 110-2 through 110-*n*. For example, a collaboration application installed on end user device 110-1 could capture video of the user, the desktop or the window of a particular application and share it with end user devices 110-2 through 110-*n*.

Figure 2:
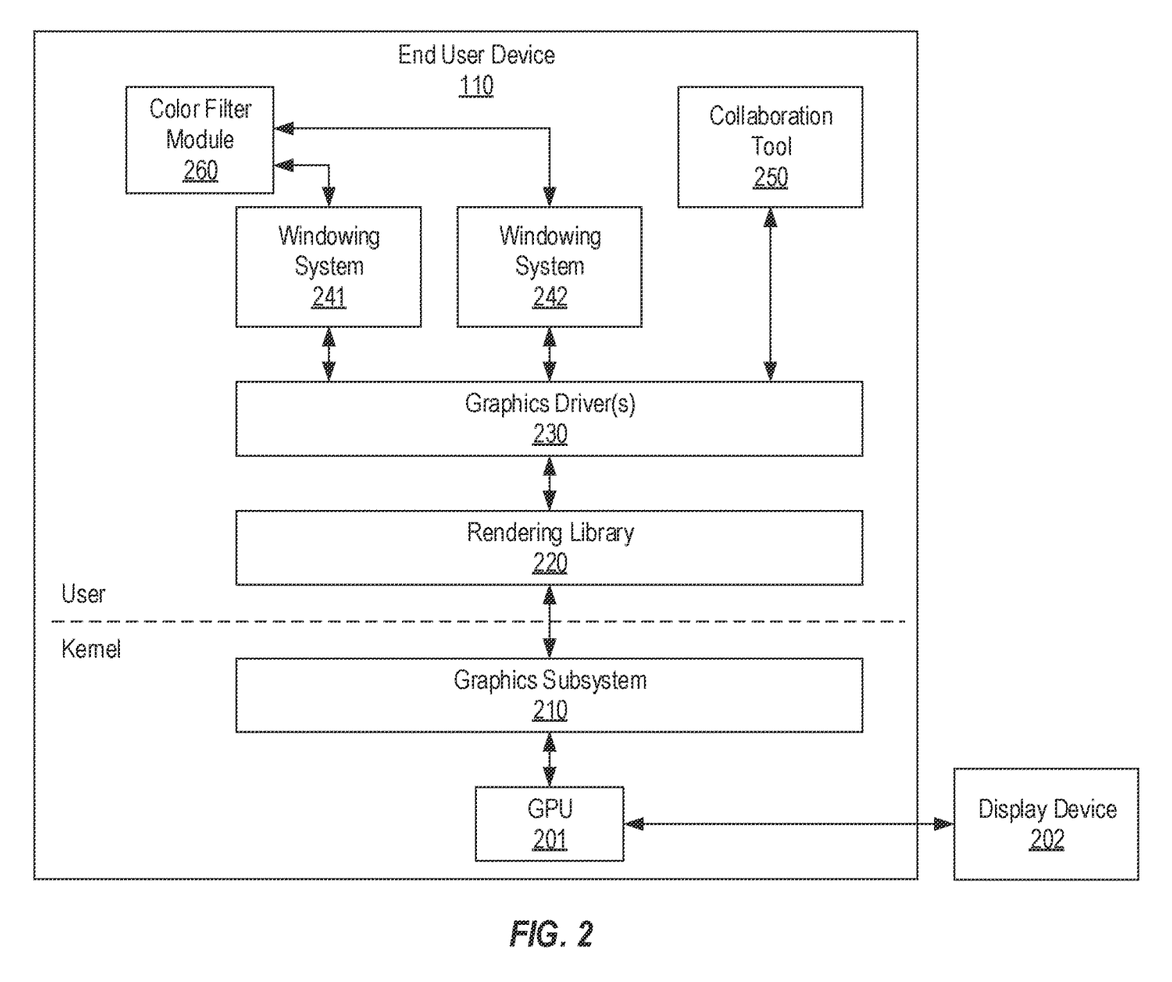
FIG. 2 illustrates an example architecture that may be employed on a computing device when one or more embodiments of the present invention are implemented.

FIG. 2 provides a Linux-based example of how an end user device 110 may be configured to enable one or more embodiments of the present invention to be implemented. As shown, end user device 110 can include a graphics processing unit (GPU) 201 and a display device 202. End user device 110 can also include a graphics subsystem 210, a rendering library 220 and graphics driver(s) 230. For example, graphics subsystem 210 can include the direct rendering manager (DRM) and the kernel mode setting (KMS) of a Linux kernel which provide functionality for accessing GPU 201. Rendering library 220 can represent a user-mode library that provides access to graphics subsystem 210. For example, rendering library 220 could represent the LibDRM middleware. In some embodiments, graphics drivers 230 could be the Mesa 3D Graphics Library or another implementation of the OpenGL, Vulkan or other graphics API specification.

End user device 110 may further include one or more windowing systems such as windowing system 241 and windowing system 242. In general, a windowing system can use graphics drivers 230 to create display content that can be output to display device 202. As examples, windowing system 241 could be a Wayland compositor and windowing system 242 could be an X server of the X Window System. Although not shown, applications or the operating system could use windowing systems 241 and 242 to cause their display content (e.g., in the form of a window or a desktop) to be rendered and output to display device 202.

End user device 110 may also include a collaboration tool 250 which can represent any collaboration tool that can share display content generated on end user device 110 with any other end user device 110. For example, collaboration tool 250 can represent the Zoom app/client, the Skype app/client, a VDI client that provides access to a shared desktop, etc. Notably, when the user shares his or her screen (e.g., desktop, window, etc.) during a collaboration session (e.g., during a Zoom meeting), collaboration tool 250 can use graphics drivers 230 to obtain the display content and then share the display content with other end user devices 110 via collaboration solution 150.

In accordance with embodiments of the present invention, end user device 110 may include a color filter module 260 that windowing systems 241 and/or 242 can use to apply a color filter to display content that is to be output to display device 202. Because color filter module 260 operates at the level of windowing systems 241 and 242, as opposed to at the level of graphics drivers 230, any color filter that windowing systems 241 and/or 242 may apply to display content that is output locally to display device 202 will not be applied to any display content that collaboration tool 250 may share with other end user devices 110. As a result, a color-blind person can benefit from the color filter during a collaboration session without causing the color filter to be applied to display content shared with other participants in the collaboration session.

Figure 3:
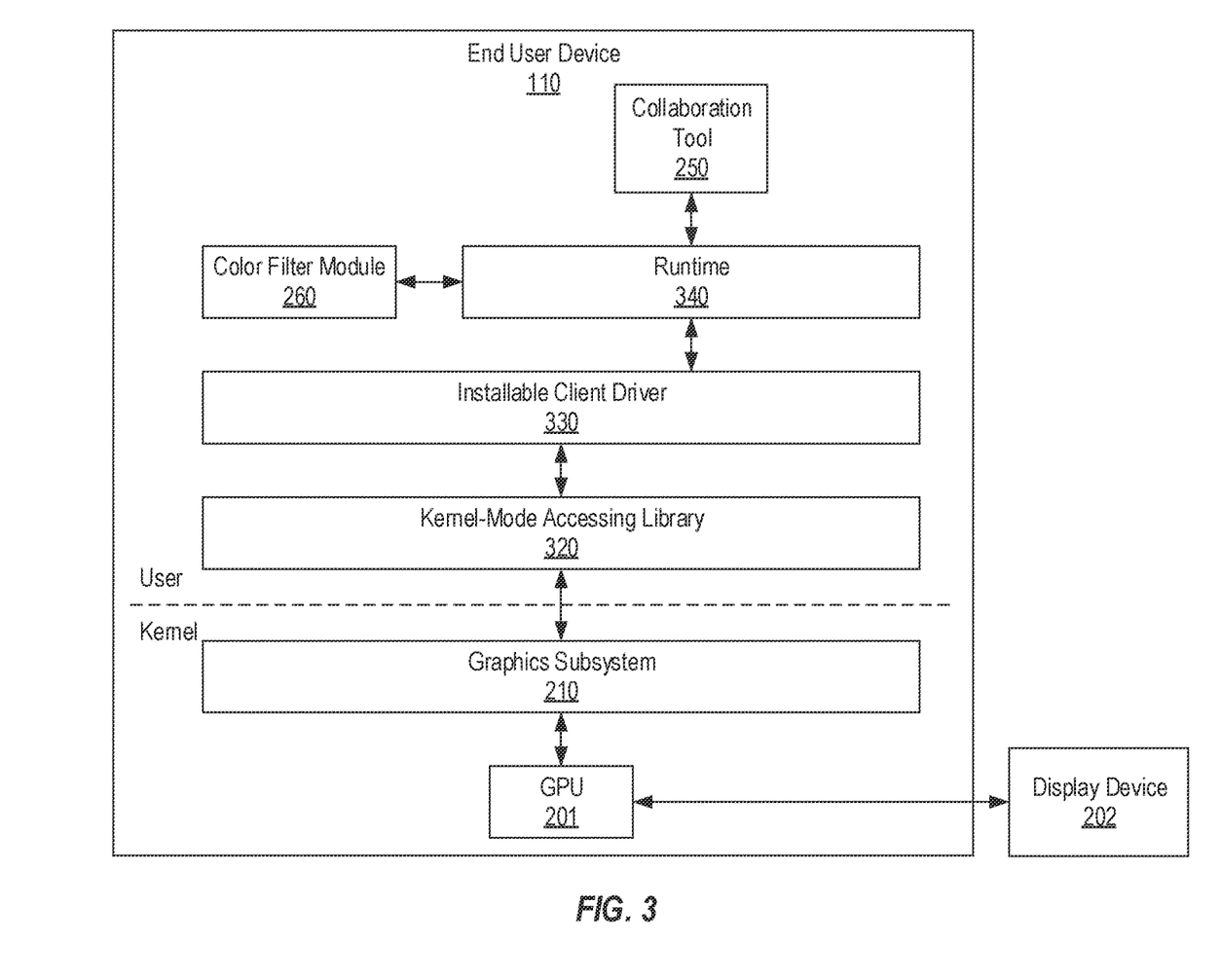
FIG. 3 illustrates another example architecture that may be employed on a computing device when one or more embodiments of the present invention are implemented.

FIG. 3 provides a Windows-based example of how an end user device 110 may be configured to enable one or more embodiments of the present invention to be implemented. In this example, graphics subsystem 210 may be the DirectX Graphics Kernel Subsystem (e.g., Dxgkrnl.sys). End user device 110 may also include a kernel-mode accessing library 320 (e.g., gdi32.dll), an installable client driver 330 (e.g., an OpenGL installable client driver) and a runtime 340 (e.g., an OpenGL runtime). For purposes of this specification and the claims, runtime 340 can be considered a windowing system and may interface with color filter module 260 to apply a color filter to display content that is to be output to display device 202. Although not shown, applications or the operating system could use runtime 340 to cause their display content (e.g., in the form of a window or a desktop) to be rendered and output to display device 202. Collaboration tool 250 may also use runtime 340 to obtain the display content and then share the display content with other end user devices 110 via collaboration solution 150.

Figure 4A:
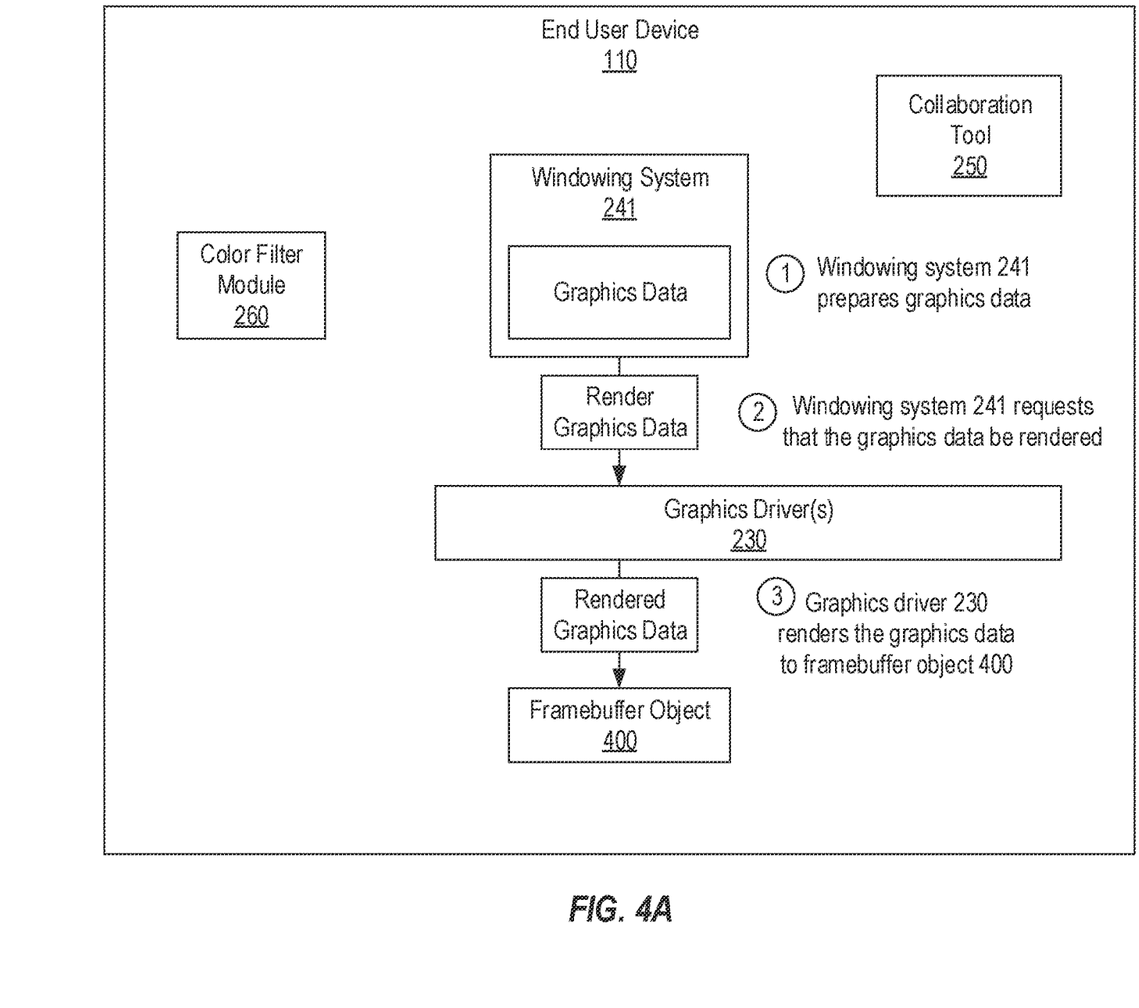
FIGS. 4A-4C provide an example of how a windowing system may apply a color filter to a frame without causing the filter to be applied to a captured frame that is shared by a collaboration tool.
Figure 4B:
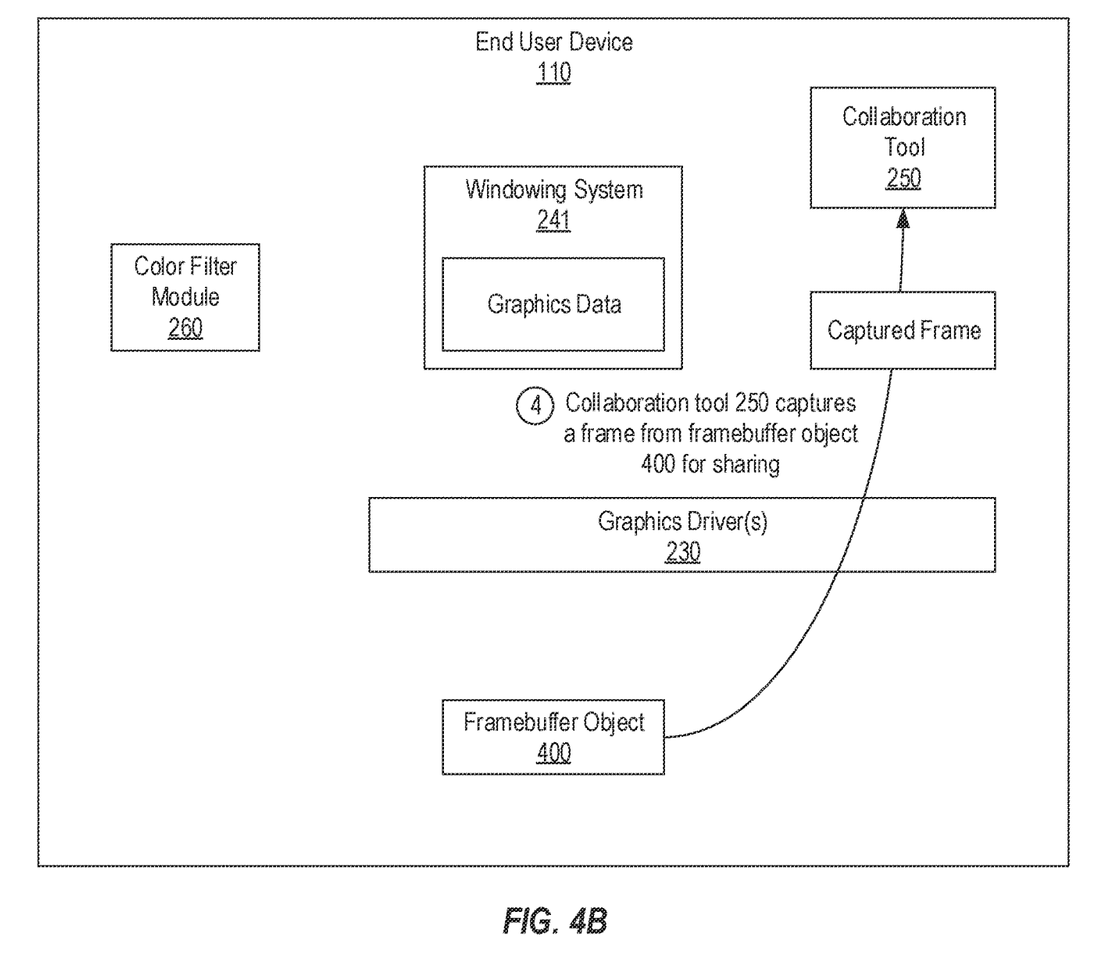
Figure 4C:
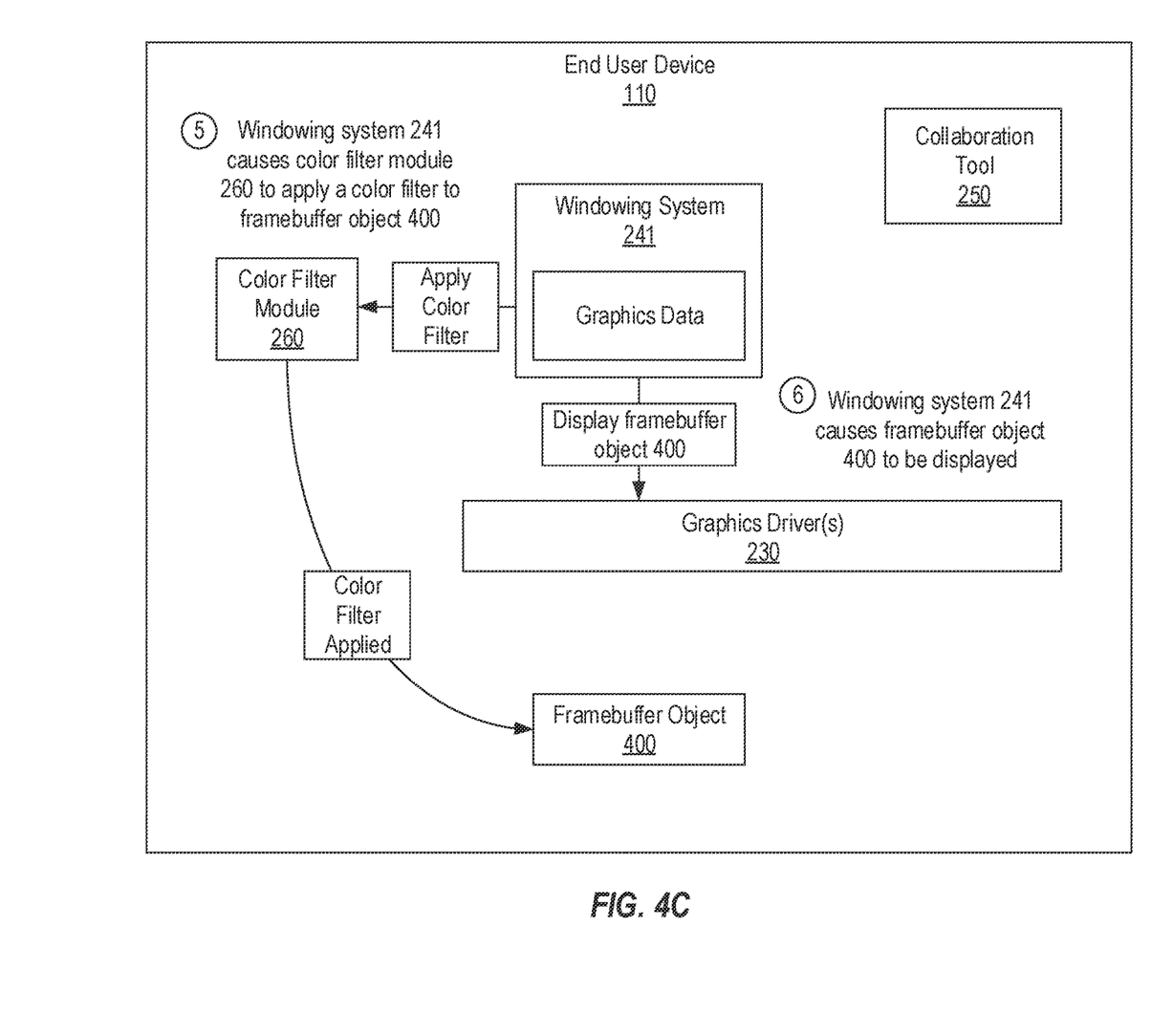

FIGS. 4A-4C provide an example of how windowing system 241 may employ color filter module 260 to apply a color filter to a frame without causing the filter to be applied to a captured frame that is shared by a collaboration tool. In this example, windowing system 241 could be replaced with an application or other source of graphics data that interfaces with runtime 340. In other words, windowing system 241 and the application/source of graphics data can perform similar functionality to apply a color filter to a frame without causing the filter to be applied to a captured frame that is shared by a collaboration tool.

In step 1 shown in FIG. 4A, windowing system 241 can prepare graphics data for use in creating a frame to be displayed on end user device 110. For example, this graphics data could include a vertex array object. In some embodiments, this graphics data may pertain to a single window, while in other embodiments, this graphics data may pertain to an entire desktop.

In step 2, windowing system 241 can request that graphics driver 230 render the graphics data into a frame buffer object 400. For example, frame buffer object 400 could represent an off-screen frame buffer object. In step 3, graphics driver 230 can render the graphics data into framebuffer object 400. Notably, at this point, framebuffer object 400 can define a complete frame for display on end user device 110 but a color filter will not yet have been applied to this frame.

Turning to FIG. 4B, in step 4, collaboration tool 250 can capture the frame defined by framebuffer object 400 for sharing via collaboration solution 150. For example, collaboration tool 250 may be configured to detect or be notified when a framebuffer is updated. In such cases, in response to step 3, collaboration tool 250 could be notified or otherwise detect that framebuffer object 400 defines a frame to be displayed on end user device 110 and can capture the frame. Because a color filter has not been applied to the frame defined in framebuffer object 400, the color filter will likewise not be applied to this captured frame. Therefore, when the captured frame is shared to and displayed on other end user devices 110 via collaboration solution 150, the users of the other end user devices 110 will see the original colors of the frame rather than the filtered colors.

Turning to FIG. 4C, in step 5, which may be performed after collaboration tool 250 has captured the frame defined by framebuffer object 400, windowing system 241 can employ color filter module 260 to directly apply a color filter to framebuffer object 400 as opposed to having graphics driver 230 apply a color filter. For example, windowing system 241 could provide framebuffer object 400 as input to color filter module 260 to thereby enable color filter module 260 to directly manipulate the color values of pixels defined in/by framebuffer object 400. Because color filter module 260 applies the color filter directly to framebuffer object 400, collaboration tool 250 will not capture the frame defined by framebuffer object 400 after the color filter is applied. For example, because graphics driver 230 does not apply the color filter, graphics driver 230 will not notify collaboration tool 250 (or collaboration tool 250 will not detect) that framebuffer object 400 has been updated.

Finally, in step 6, windowing system 241 can cause framebuffer object 400 to be displayed on end user device 110 (e.g., by calling glSwapBuffers in OpenGL-based implementations). Because the color filter has been applied to the frame defined by framebuffer object 400 when it is displayed, the user will see the frame with the colorblindness filter applied.

This process can be repeated whenever framebuffer object 400 (or other framebuffer object) is used to render and display a frame. For example, steps 1-3 can be repeated to create the next frame for an application's window or for the entire desktop. Step 4 could then be repeated to share this next frame via collaboration solution 150 before the color filter is applied. Steps 5 and 6 could then be repeated to apply the color filter to the frame and display it locally.

Figure 5:
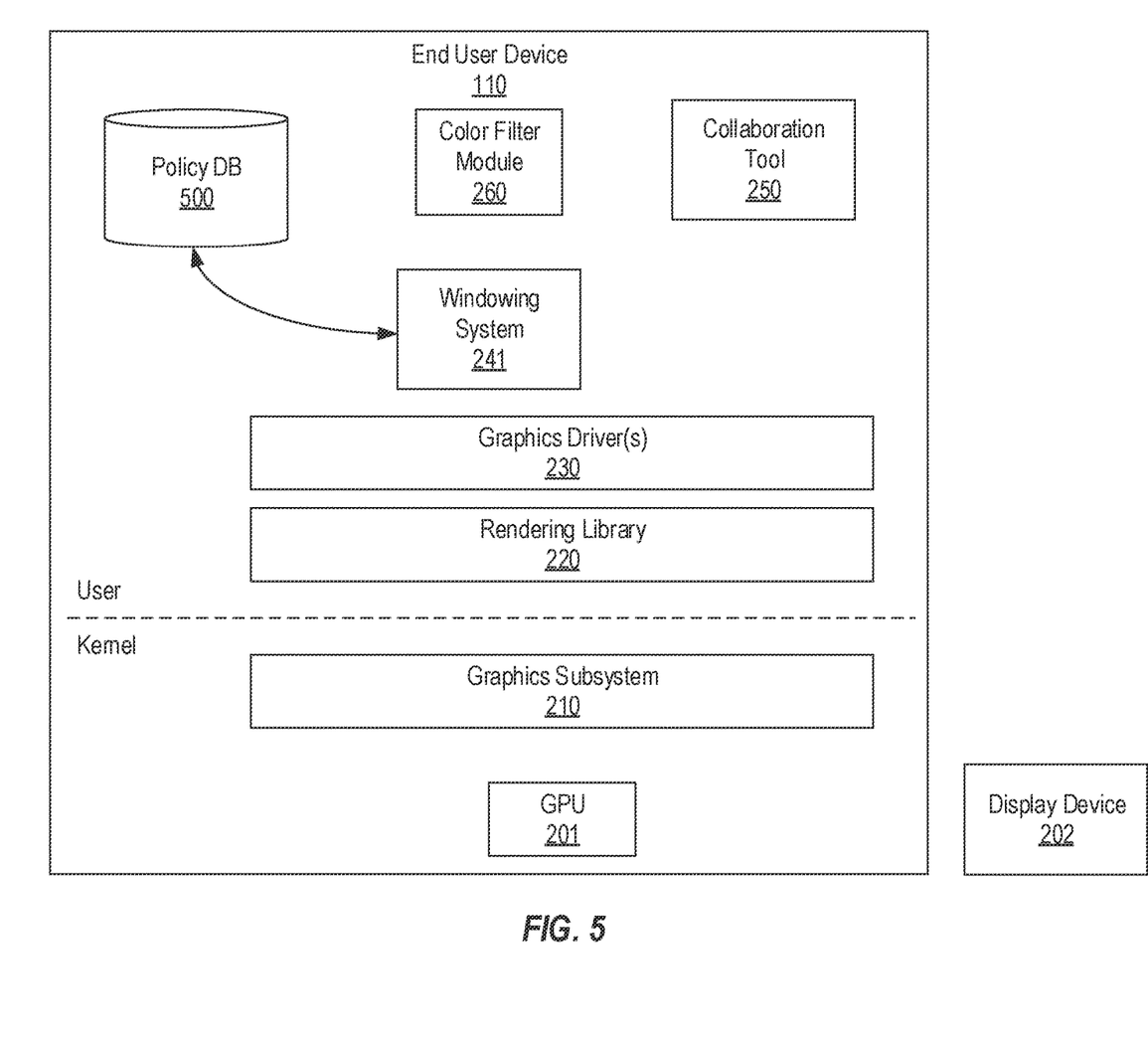
FIG. 5 provides an example of how a policy can be used to determine whether a color filter should be applied.

FIG. 5, which is based on FIG. 2, provides an example of how policy can be used to selectively enable the application of a color filter in accordance with the above-described techniques. As shown, windowing system 241 (or a component of windowing system 241) can be configured to access policy database to identify a policy applicable to a current user or other scenario and then use such policy to determine whether to apply a color filter. For example, a component of windowing system 241 could be configured to determine who the currently logged in user is and to identify a policy applicable to the currently logged in user. If the policy dictates that a color filter should be applied when the user is logged in, windowing system 241 can perform the above-described functionality to apply the color filter to frames when they are displayed locally but not when the frames are captured and shared. In some embodiments, a policy may specify that a color filter should only be applied to frames of specified windows, may limit the application of the color filter to specified scenarios or may otherwise customize the application of the color filter. By employing policy, a user of end user device 110 can benefit from the color filter without impacting other users of end user device 110.

In summary, embodiments of the present invention may be implemented to prevent a color filter from being applied when a user shares his or her screen in a collaboration environment while retaining the ability to have the color filter applied to the local display. Embodiments of the present invention may therefore minimize unintended consequences during collaboration sessions and enhance the user experience.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enabling display filters in collaborative environments, the method comprising:
   rendering, via a graphics driver, graphics data to a framebuffer object to define a frame to thereby enable a collaboration tool to capture and share the frame via a collaboration solution;
   after the frame is rendered to the framebuffer object and captured by the collaboration tool, causing a color filter to be directly applied to the frame defined in the framebuffer object rather than being applied via the graphics driver; and
   after the color filter has been directly applied to the frame defined in the framebuffer object, causing the frame to be displayed locally.

2. The method of claim 1, wherein the graphics driver is an OpenGL graphics driver.

3. The method of claim 1, wherein the method is performed by a windowing system.

4. The method of claim 1, wherein the method is performed by an application.

5. The method of claim 1, wherein the graphics driver comprises a runtime.

6. The method of claim 1, wherein causing the color filter to be directly applied to the frame defined in the framebuffer object rather than being applied via the graphics driver comprises interfacing with a color filter module to cause the color filter module to apply the color filter to the frame without using the graphics driver.

7. The method of claim 1, wherein causing the frame to be displayed locally comprises swapping the framebuffer object.

8. The method of claim 1, further comprising:
determining that a policy dictates that the color filter should be applied to the frame.

9. The method of claim 8, wherein determining that the policy dictates that the color filter should be applied to the frame comprises determining that the policy is applicable to a currently logged in user.

10. The method of claim 1, wherein the frame defines a window or a desktop.

11. The method of claim 1, wherein each of the frames defines a window or a desktop.

12. One or more computer storage media storing computer executable instructions which when executed implement a method for enabling display filters in collaborative environments, the method comprising:
repeatedly rendering, via a graphics driver, graphics data to a framebuffer object to define frames to thereby enable a collaboration tool to capture and share the frames via a collaboration solution;
after each of the frames is rendered to the framebuffer object and captured by the collaboration tool, causing a color filter to be directly applied to the frame rather than being applied via the graphics driver; and
after the color filter has been directly applied each of the frames, causing the frame to be displayed locally.

13. The computer storage media of claim 12, wherein the method is performed by a windowing system.

14. The computer storage media of claim 12, wherein the method is performed by an application.

15. The computer storage media of claim 12, wherein causing the color filter to be directly applied to each of the frames rather than being applied via the graphics driver comprises interfacing with a color filter module to cause the color filter module to apply the color filter to each of the frames without using the graphics driver.

16. The computer storage media of claim 12, wherein causing each of the frames to be displayed locally comprises swapping the framebuffer object.

17. The computer storage media of claim 12, wherein the method further comprises:
determining that a policy dictates that the color filter should be applied to each of the frames.

18. The computer storage media of claim 17, wherein determining that the policy dictates that the color filter should be applied to each of the frames comprises determining that the policy is applicable to a currently logged in user.

19. An end user device comprising:
one or more processors; and
computer storage media storing computer executable instructions which when executed implement a method for enabling display filters in collaborative environments, the method comprising:
rendering, via a graphics driver, graphics data to a framebuffer object to define a frame to thereby enable a collaboration tool to capture and share the frame via a collaboration solution;
after the frame is rendered to the framebuffer object and captured by the collaboration tool, causing a color filter to be directly applied to the frame defined in the framebuffer object rather than being applied via the graphics driver; and
after the color filter has been directly applied to the frame defined in the framebuffer object, causing the frame to be displayed locally.

20. The end user device of claim 19, wherein causing the color filter to be directly applied to the frame rather than being applied via the graphics driver comprises interfacing with a color filter module to cause the color filter module to apply the color filter the frame without using the graphics driver.

* * * * *